(12) United States Patent
Prudkovskiy (10) Patent No.: US 11,936,673 B2
(45) Date of Patent: Mar. 19, 2024

(54) METHOD AND SYSTEM FOR DETECTING HARMFUL WEB RESOURCES

(71) Applicant: Group IB, Ltd, Moscow (RU)

(72) Inventor: Nikolay Prudkovskiy, Moscow (RU)

(73) Assignee: GROUP IB, LTD, Moscow (RU)

( * ) Notice: Subject to any disclaimer, the term of this patent is extended or adjusted under 35 U.S.C. 154(b) by 466 days.

(21) Appl. No.: 17/117,893

(22) Filed: Dec. 10, 2020

(65) Prior Publication Data

US 2021/0360012 A1  Nov. 18, 2021

(30) Foreign Application Priority Data

May 12, 2020  (RU) ................................ 2020115830

(51) Int. Cl.

| | |
|---|---|
| *H04L 9/40* | (2022.01) |
| *G06F 16/2457* | (2019.01) |
| *G06F 16/955* | (2019.01) |
| *G06F 16/958* | (2019.01) |
| *G06N 20/00* | (2019.01) |

(52) U.S. Cl.
CPC .... *H04L 63/1425* (2013.01); *G06F 16/24578* (2019.01); *G06F 16/9566* (2019.01); *G06F 16/986* (2019.01); *G06N 20/00* (2019.01); *H04L 63/1416* (2013.01)

(58) Field of Classification Search
CPC .............. G06N 20/00; G06F 16/24578; H04L 63/1416
See application file for complete search history.

(56) References Cited

U.S. PATENT DOCUMENTS 9,323,826 B2    4/2016  Bailey et al.
9,979,748 B2 *  5/2018  O'Connor ............. H04L 63/145
(Continued)

FOREIGN PATENT DOCUMENTS

CN    108304509 A    7/2018
RU          7465 U1   10/2008

OTHER PUBLICATIONS

Grant Decision and Search Report with regard to the RU Patent Application No. 2020115830 completed Nov. 9, 2020.
(Continued)

*Primary Examiner* — Lynn D Feild
*Assistant Examiner* — Saad Ahmad Abdullah
(74) *Attorney, Agent, or Firm* — BCF LLP (57) ABSTRACT

A method and a system for detecting harmful content on a network are provided. The method comprises: receiving a URL; obtaining, from the URL, an HTML document associated therewith; converting the HTML document into a text; normalizing the text associated with the HTML document, thereby generating a plurality of tokens associated therewith; aggregating, each one of the plurality of tokens into a token vector associated with the HTML document; and applying, one or more classifiers to the token vector associated with the HTML document to determine a likelihood parameter indicative of the URL being associated with the harmful content; in response to the likelihood parameter being equal to or greater than a predetermined likelihood parameter threshold: identifying, the URL as being associated with the harmful content; and storing, the URL in a database of harmful URLs.

17 Claims, 6 Drawing Sheets

(56) References Cited

U.S. PATENT DOCUMENTS

| | | | |
|---|---|---|---|
| 10,764,353 B2 | 9/2020 | Harz et al. | |
| 2007/0067157 A1* | 3/2007 | Kaku | G06F 40/289 |
| | | | 704/10 |
| 2012/0158626 A1* | 6/2012 | Zhu | G06F 21/56 |
| | | | 726/22 |
| 2015/0156183 A1 | 6/2015 | Beyer et al. | |
| 2016/0042273 A1* | 2/2016 | Brunet | G06Q 30/016 |
| | | | 706/11 |
| 2016/0162576 A1 | 6/2016 | Ariño De La Rubia | |
| 2016/0171529 A1* | 6/2016 | Skalet | G06Q 30/0248 |
| | | | 705/14.47 |
| 2017/0262629 A1* | 9/2017 | Xu | G06F 21/56 |
| 2019/0052692 A1 | 2/2019 | Borrowman et al. | |
| 2021/0303818 A1* | 9/2021 | Randolph | G06N 5/045 |

OTHER PUBLICATIONS

English Abstract for CN108304509 retrieved on Espacenet on Dec. 8, 2020.

English Abstract for RU77465 retrieved on Yandex Translate on Dec. 9, 2020.

* cited by examiner

METHOD AND SYSTEM FOR DETECTING HARMFUL WEB RESOURCES

CROSS-REFERENCE

The present application claims priority to Russian Patent Application No. 2020115830, entitled "METHOD AND SYSTEM FOR DETECTING HARMFUL WEB RESOURCES," filed on May 12, 2020, the entirety of which is incorporated herein by reference.

FIELD

The present technology broadly relates to the field of information security; and in particular, to a method and system for detecting harmful web resources on a network.

BACKGROUND

Nowadays, governments of many countries are introducing legislation to regulate web content on the Internet that may be considered as "harmful". Such content may include content associated with one or more predetermined categories, access to which may be desirous to be restricted for viewing and familiarization.

However, control of the harmful content may be challenging as the rate of growth, updating and spread of information on the Internet is increasing.

For example, the present technical issue may be resolved by employing automatic filtering of the harmful content based on databases of preliminarily compiled lists of URLs of web resources, recognition of predetermined keywords, and other types of classification.

However, such approaches do not provide adequate quality, since the lists are compiled manually and do not allow considering newly appeared resources; furthermore, the predetermined keywords may not fully be indicative of the harmful content but may rather give a rough estimate. Further, the approach based on the recognition of predetermined keywords may cause false blocking of web resources—for example, when the predetermined keywords are used in a figurative sense.

Certain prior art approaches in the prior art have been proposed to tackle the above-identified technical issue.

U.S. Pat. No. 10,764,353-B2 issued on Sep. 1, 2020, assigned to International Business Machines Corp., and entitled "Automatic Genre Classification Determination of Web Content to which the Web Content Belongs Together with a Corresponding Genre Probability" discloses a mechanism for automatic genre determination of web content. For each type of web content genre, a set of relevant feature types are extracted from collected training material, where genre features and non-genre features are represented by tokens and an integer counts represents a frequency of appearance of the token in both a first type of training material and a second type of training material. In a classification process, fixed length tokens are extracted for relevant features types from different text and structural elements of web content. For each relevant feature type, a corresponding feature probability is calculated. The feature probabilities are combined to an overall genre probability that the web content belongs to a specific trained web content genre. A genre classification result is then output comprising at least one specific trained web content genre to which the web content belongs together with a corresponding genre probability.

U.S. Pat. No. 9,323,826-B2 issued on Apr. 26, 2016, assigned to Datamir Inc., and entitled "Methods, Apparatus and Software for Analyzing the Content of Micro-Blog Messages", discloses methods, systems and software for analyzing micro-blog messages to detect activity of interest. The system includes a clusterer for clustering micro-blog messages received over a first period of time, a classifier for scoring the clustered messages; a knowledge base, a rule generator for generating classification rules from the knowledge base; and a matcher for matching the scored messages to information requests. Methods for operating the system and its components are described.

United States Patent Application Publication No.: 2015/0156183-A1 published on Jun. 4, 2015, assigned to GateSecure SA, and entitled "System and Method for Filtering Network Communications" discloses a secure network gateway system and a filtering method using the system. The secure network gateway system includes a tunneling front end node capable of establishing a communication tunnel with a client access point and authenticating a user to allow the user to access to a wide area network via the communication tunnel. The system also includes a plurality of filter nodes. A plurality of filtering rules are associated with the authenticated user. The tunneling front end node is capable of determining how to handle transmissions to and from the authenticated user according to these filtering rules and passing the transmissions to the appropriate filter nodes. The filter nodes are capable of filtering transmissions according to the filtering rules and passing the filtered transmissions to the tunneling front end node for forwarding to the authenticated user via the communications tunnel.

SUMMARY

It is an object of the present technology is to ameliorate at least some of the inconveniences present in the prior art.

Developers of the present technology have appreciated that accuracy of detection of the harmful content may be significantly improved by applying a specifically trained classifier to web resources to be examined for presence of the harmful content therein. Accordingly, the classifier, for a given web resource, may further return a likelihood value indicative of whether the given web resource contains the harmful content or not.

Unlike the above-described prior art approaches, the presently claimed method is not limited to a predetermined lists of keywords, nor is it sensitive to changing forms of words in the texts associated with web resources under examination. Instead, certain non-limiting embodiments of the present technology are directed to training the classifier based on specifically normalized word forms, which further allows improving the quality of classification.

More specifically, in accordance with a first broad aspect of the present technology, there is provided a method for detecting harmful content on a network. The method is executable by a computing device comprising a processor. The method comprises: receiving, by the processor, via the network, a URL; obtaining, by the processor, from the URL, an HTML document associated therewith; converting, by the processor, the HTML document into a text; normalizing, by the processor, the text associated with the HTML document, thereby generating a plurality of tokens associated therewith; aggregating, by the processor, each one of the plurality of tokens into a token vector associated with the HTML document; applying, by the processor, one or more classifiers to the token vector associated with the HTML document to determine a likelihood parameter indicative of the URL being associated with the harmful content, the one or more classifiers having been trained to determine the harmful content based on a respective training set of data, the respective training set of data comprising a training token matrix having been generated by: receiving, by the processor, a plurality of training HTML documents; converting, by the processor, each one of the plurality of training HTML documents, into a respective training text of a plurality of training texts; normalizing, by the processor, a given one of the plurality of training texts, thereby generating a respective plurality of training tokens associated therewith, determining, by the processor, for each one of the respective plurality of training tokens, a respective significance parameter; aggregating, by the processor, respective pluralities of training tokens of the plurality of training HTML documents associated with respective significance parameters into the training token matrix; in response to the likelihood parameter being equal to or greater than a predetermined likelihood parameter threshold: identifying, by the processor, the URL as being associated with the harmful content; and storing, by the processor, the URL in a database of harmful URLs.

In some implementations of the method, the method further comprises restricting access to the URL.

In some implementations of the method, the normalizing comprises applying, by the processor, one or more natural language processing techniques.

In some implementations of the method, the normalizing one of the text and the given one of the plurality of training texts further comprises at least one of: excluding punctuation from each one of the text and the given one of the plurality of training texts; transforming all letters to lower case; transforming each word of each one of the text and the given one of the plurality of training texts to a respective canonic form thereof; and morphological analysis.

In some implementations of the method, the training token matrix is structured such that: a given row of the training token matrix being representative of a respective one of the plurality of training HTML documents; a given column of the training token matrix being representative of a respective training token; and a given element of the training token matrix being representative of a respective significance parameter of the respective token in the respective one of the plurality of training HTML documents.

In some implementations of the method, converting one of the HTML document and a given one of the plurality of HTML documents into a respective text comprises extracting respective text portions of the respective text from one or more predetermined fields of the one of the HTML document and a given one of the plurality of HTML documents; and normalizing the respective text includes normalizing each one of the respective text portions in parallel.

In some implementations of the method, the one or more predetermined fields of the one of the HTML document and a given one of the plurality of HTML documents include at least one of: 'text', 'title', 'meta', and 'url'.

In some implementations of the method, the generating the plurality of tokens associated with the HTML document further comprises: identifying, by the processor, within the plurality of tokens, a sub-plurality of tokens, wherein each one of the sub-plurality of tokens is associated with at least one of a plurality of predetermined classes of the harmful content; and aggregating, by the processor, the sub-plurality of tokens into the token vector associated with the HTML document.

In some implementations of the method, the plurality of predetermined classes of the harmful content includes at last one of: business and industry, career and education, arts and entertainment, science, computers and electronics, shopping, reference, people and society, internet and telecom, sports, finance, adult, autos and vehicles, books and literature, health, games, law and government, travel, news and media, home and garden, food and drink, gambling, recreation and hobbies, beauty and fitness, and pets and animals.

In some implementations of the method, a given significance parameter associated with a given one of the plurality of training tokens is indicative of a combination of: a local frequency of occurrence of the given one of the plurality of training tokens within the given one of the plurality training texts associated with a respective one of the plurality of training HTML documents; and a global frequency of occurrence of the given one of the respective plurality of training tokens within the plurality of training texts of the plurality of training HTML documents.

In some implementations of the method, the given significance parameter associated with the given one of the plurality of training tokens is determined based on a product of multiplication of the local frequency of occurrence and an inverse value of the global frequency of occurrence associated therewith.

Further, in accordance with a second broad aspect of the present technology, there is provided a method for detecting harmful content on a network using one or more classifiers. The method is executable by a computing device comprising a processor. The method comprises training the one or more classifiers based on a respective training set of data by executing the steps of: receiving, by the processor, a plurality of training HTML documents; converting, by the processor, each one of the plurality of training HTML documents, a respective training text of a plurality of training texts, normalizing, by the processor, a given one of the plurality of training texts, thereby generating a respective plurality of training tokens associated therewith; determining, by the processor, for each one of the respective plurality of training tokens, a respective significance parameter, aggregating, by the processor, respective pluralities of training tokens of the plurality of training HTML documents into a training token matrix of the respective training set of data, wherein: a given row of the training token matrix being representative of a respective one of the plurality of training HTML documents; a given column of the training token matrix being representative of a respective training token; and a given element of the training token matrix being representative of a respective significance parameter of the respective token in the respective one of the plurality of training HTML documents; training, by the processor, the one or more classifiers based on the respective training set of data; using, by the processor, the one or more classifiers to determine a likelihood parameter that a given HTML document is associated with the harmful content.

In some implementations of the method, the normalizing comprises applying, by the processor, one or more natural language processing techniques.

In some implementations of the method, the determining the likelihood parameter is based on respective decisions generated by the one or more classifiers, and each one of the respective decisions being assigned a respective decision weight.

In some implementations of the method, the one or more classifiers includes at least one of: a Random Forest classifier, an XGB classifier, a Logistic Regression classifier, and an SVM classifier.

In some implementations of the method, the method further comprises identifying, in the respective plurality of training tokens, tokens non-indicative of the harmful content and deleting the tokens non-indicative of the harmful content therefrom.

In some implementations of the method, the generating the respective plurality of training tokens further comprises: identifying, by the processor, within the respective plurality of training tokens, a sub-plurality of training tokens associated with at least one of a plurality of predetermined classes of harmful content; and aggregating, by the processor, the sub-plurality of training tokens into the training token matrix.

In some implementations of the method, the plurality of predetermined classes of the harmful content includes at last one of: business and industry, career and education, arts and entertainment, science, computers and electronics, shopping, reference, people and society, internet and telecom, sports, finance, adult, autos and vehicles, books and literature, health, games, law and government, travel, news and media, home and garden, food and drink, gambling, recreation and hobbies, beauty and fitness, pets and animals.

In some implementations of the method, a given significance parameter associated with a given one of the plurality of training tokens is indicative of a combination of: a local frequency of occurrence of the given one of the plurality of training tokens within the given one of the plurality training texts associated with a respective one of the plurality of training HTML documents; and a global frequency of occurrence of the given one of the respective plurality of training tokens within the plurality of training texts of the plurality of training HTML documents.

In some implementations of the method, the given significance parameter associated with the given one of the plurality of training tokens is determined based on a product of multiplication of the local frequency of occurrence and an inverse value of the global frequency of occurrence associated therewith.

Finally, in accordance with a third broad aspect of the present technology, there is provided a system for detecting harmful content on a network. The system comprises a computing device, the computing device further comprising: a processor and a non-transitory computer-readable medium comprising instructions. The processor, upon executing the instructions, is configured to: receive, via the network, a URL; obtain, from the URL, an HTML document associated therewith; convert the HTML document into a text; normalize the text associated with the HTML document, thereby generating a plurality of tokens associated therewith; aggregate each one of the plurality of tokens into a token vector associated with the HTML document; apply one or more classifiers to the token vector associated with the HTML document to determine a likelihood parameter indicative of the URL being associated with the harmful content, the one or more classifiers having been trained to determine the harmful content based on a respective training set of data, the respective training set of data having been generated by: receiving a plurality of training HTML documents; converting each one of the plurality of training HTML documents, into a respective training text of a plurality of training texts; normalizing a given one of the plurality of training texts, thereby generating a respective plurality of training tokens associated therewith, determining for each one of the respective plurality of training tokens, a respective significance parameter, a given significance parameter associated with a given one of the plurality of training tokens being indicative of a combination of: a local frequency of occurrence of the given one of the plurality of training tokens within the given one of the plurality training texts associated with a respective one of the plurality of training HTML documents; and a global frequency of occurrence of the given one of the respective plurality of training tokens within the plurality of training texts of the plurality of training HTML documents; aggregating respective pluralities of training tokens of the plurality of training HTML documents associated with respective significance parameters into a training token matrix of the respective training set of data, wherein: a given row of the training token matrix being representative of a respective one of the plurality of training HTML documents; a given column of the training token matrix being representative of a respective training token; and a given element of the training token matrix being representative of a respective significance parameter of the respective token in the respective one of the plurality of training HTML documents;

in response to the likelihood parameter being equal to or greater than a predetermined likelihood parameter threshold: identify the URL as being associated with the harmful content; and store the URL in a database of harmful URLs.

In some implementations of the system, the processor is configured to determine the given significance parameter associated with the given one of the plurality of training tokens based on a product of multiplication of the local frequency of occurrence and an inverse value of the global frequency of occurrence associated therewith.

Further, in the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF DRAWINGS

Non-limiting embodiments of the present technology are described herein with reference to the accompanying drawings; these drawings are only presented to explain the essence of the technology and are not limiting the scope thereof in any way, where.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to computer-implemented methods and systems for detecting content associated with one or more predetermined classes on a network, which is also referred to herein as "harmful content"

Figure 1:
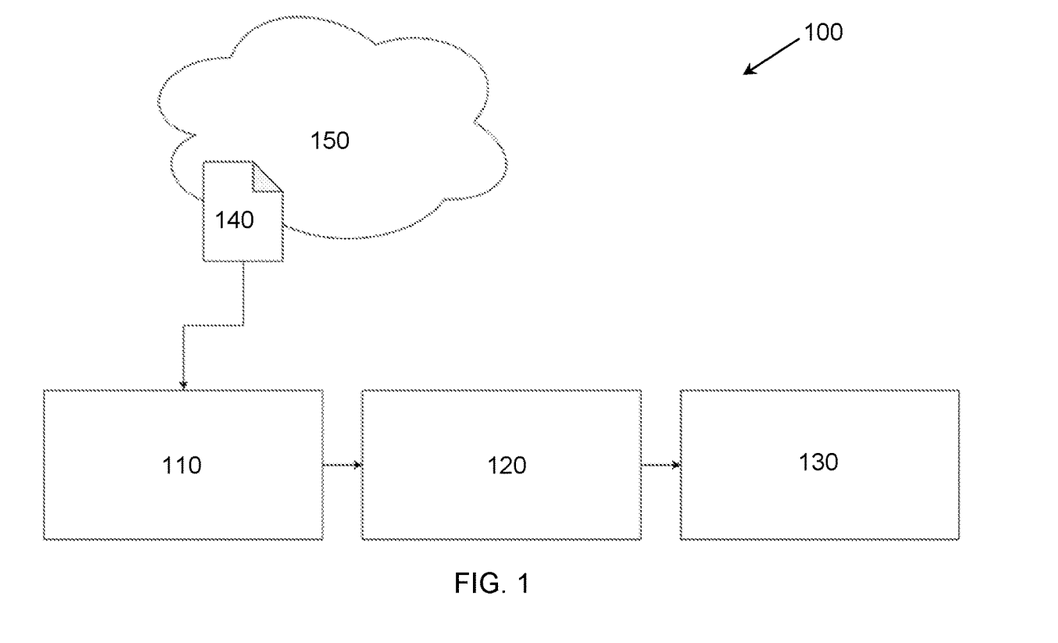
FIG. 1 depicts a schematic diagram of an example system for detecting harmful content on a network, in accordance with certain non-limiting embodiments of the present technology.

Referring initially to FIG. 1, there is depicted a schematic diagram of a system 100 suitable for implementing certain non-limiting embodiments of the present technology. According to certain non-limiting embodiments of the present technology, the system 100 may be configured to detect the harmful content on a network, such a network 150. To that end, the system 100 may comprise a data collection module 110, a computing device 120, and an output module 130.

In some non-limiting embodiments of the present technology, the network 150 is the Internet. In alternative non-limiting embodiments of the present technology, the network 150 can be implemented as any suitable local area network (LAN), wide area network (WAN), a private communication network or the like. It should be expressly understood that implementations for the network 150 are for illustration purposes only. How a respective communication link (not separately numbered) between each one of the data collection module 110, the computing device 120, the output module 130, and the network 150 is implemented will depend, inter alia, on how each one of the data collection module 110, the computing device 120, and the output module 130 is implemented. Merely as an example and not as a limitation, in those embodiments of the present technology where the computing device 120 is implemented as a wireless communication device such as a smartphone, the communication link can be implemented as a wireless communication link. Examples of wireless communication links include, but are not limited to, a 3G communication network link, a 4G communication network link, and the like.

It should further be noted that the data collection module 110, the computing device 120, and the output module 130 are depicted in FIG. 1 as separate entities only for the purposes of clarity of explanation, and in certain non-limiting embodiments of the present technology, these modules may be implemented in a single software or hardware module, as will be described below.

In some non-limiting embodiments of the present technology, the data collection module 110 can be configured to receive, from the network 150, a given Uniform Resource Locator (URL) of interest for further analysis thereof for presence of the harmful content. Further, the data collection module may be configured to obtain, a given HTML document 140 associated with the given URL—for example, the data collection module 110 may be configured to download and store, in an internal database of the system 100, the given HTML document 140 located at the given URL.

Further, in accordance with certain non-limiting embodiments of the present technology, the data collection module 110 may be configured to transmit the given HTML document to the computing device 120 for further determining presence therein of the harmful content. To that end, in some non-limiting embodiments of the present technology, the computing device 120 may be configured to implement one of methods for detecting the harmful content described herein below. For example, these methods may be executed by a processor 601 of a computing environment 500 associated with the computing device 120, as will be described below with reference to FIG. 5.

Further, in some non-limiting embodiments of the present technology, the processor 601 may be configured to transmit a result of the analysis to the output module 130, which may further be configured to output an analytical report on the given URL received by the data collection module 110.

According to certain non-limiting embodiments of the present technology, the methods for detecting the harmful content on the network 150 are based on using one or more classifiers specifically trained to detect the harmful content; and as such, the methods described herein include methods for training the one or more classifiers and those for using them on the network 150.

Training the Classifier

Figure 2:
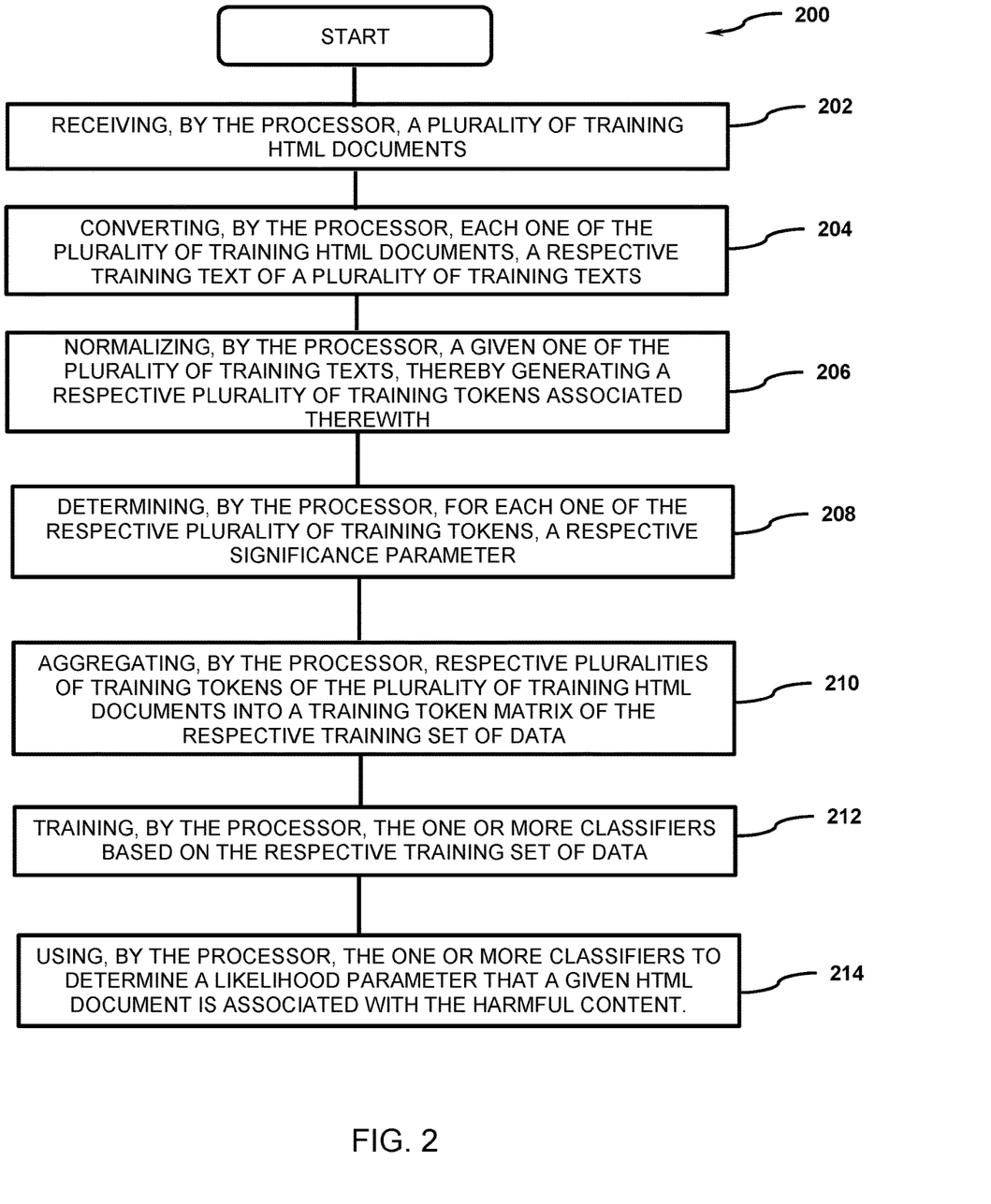
FIG. 2 depicts a flowchart diagram of a method for training a classifier to detect the harmful content on the network present in FIG. 1, in accordance with certain non-limiting embodiments of the present technology.

Now, with reference to FIG. 2, there is depicted a flowchart diagram of a first method 200 for training a classifier to detect the harmful content on the network 150, in accordance with certain non-limiting embodiments of the present technology.

Step 202: Receiving, by the Processor, a Plurality of Training HTML Documents According to certain non-limiting embodiments of the present technology, the first method 200 commences at step 202, where the processor 601 may be configured to receive a plurality of training HTML documents of different predetermined classes.

For example, in certain non-limiting embodiments of the present technology, each one of the plurality of training HTML documents can be associated with one or more of the following predetermined classes including, without limitation: business and industry, career and education, arts and entertainment, science, computers and electronics, shopping, reference, people and society, internet and telecom, sports, finance, adult, autos and vehicles, books and literature, health, games, law and government, travel, news and media, home and garden, food and drink, gambling, recreation and hobbies, beauty and fitness, pets and animals.

In some non-limiting embodiments of the present technology, the plurality of training HTML documents could be received in advance and stored in the internal database of the system 100, or can be obtained, by the processor 601, from external databases via the network 150, as an example.

Further, in other non-limiting embodiments of the present technology, the plurality of training HTML documents can be preliminarily retrieved, from the network 150, by way of using a web resource scanner, by the processor 601, that scans various URLs on the network 150, and is able to extract associated HTML documents and certain features of interest therefrom.

The first method 200 thus proceeds to step 204.

Step 204: Converting, by the Processor, Each One of the Plurality of Training HTML Documents, a Respective Training Text of a Plurality of Training Texts At step 220, the processor 601 may be configured to convert each one of the plurality of training HTML documents in a respective training text. To that end, the processor 601 may be configured to use a program script pre-configured to convert a given HTML document into text. For example, the processor 6012 may be configured to apply an <html2text> script to each one of the plurality of training HTML documents.

By doing so, in some non-limiting embodiments of the present technology, the processor 601 may be configured to extract text data from one or more predetermined fields of a given one of the plurality of training HTML documents. For example, in specific non-limiting embodiments of the present technology, the one or more fields may include, without limitation: a 'text' field including text data from an html body of the given one of the plurality of training HTML documents, a 'title' field, that is, within tags <title> . . . </title> fields, a 'meta' field, and a 'url'-page url, as an example.

Thus, in accordance with certain non-limiting embodiments of the present technology, the given one of the plurality of training HTML documents may further be associated with a respective plurality of training texts, each of which may be extracted from a respective.

Further, the processor 601 may be configured to combine, based on the one or more predetermined fields, respective texts over the plurality of training HTML documents. For example, all <text> fields extracted from the plurality of training HTML documents may be combined into a first text chain, all <title> fields may be combined into a second text chain, all <meta> fields may be combined into a third text chain, and all <url> fields may be combined into a fourth text chain.

It should be noted that, in some non-limiting embodiments of the present technology, the processor 601 may further be configured to process each one of the plurality of text chains in parallel, however, each one of the plurality of text chains may be processed differently.

After the converting, the first method 200 proceeds to the steps of generating, based on the plurality of text chains, a training set of data for training the classifier. In accordance with certain non-limiting embodiments of the present technology, the training set of data may comprise a training token matrix, generation of which will now be described.

Step 206: Normalizing, by the Processor, a Given One of the Plurality of Training Texts, Thereby Generating a Respective Plurality of Training Tokens Associated Therewith At step 206, according to certain non-limiting embodiments of the present technology, the processor 601 may be configured to normalize each one of the plurality of text chains including respective pluralities of training texts associated with the given one of the plurality of training HTML documents, thereby generating respective pluralities of training tokens, as will be described below.

To that end, in some non-limiting embodiments of the present technology, for each one of the plurality of text chains, the processor 601 may be configured to: (1) exclude all punctuation signs; (2) transform all letters to a lower case; and (3) all words are converted to respective canonic forms thereof. Further, in some non-limiting embodiments of the present technology, the processor 601 may apply symbolic and statistical natural language processing techniques; as well as apply morphological analysis to words of the plurality of text chains.

For example, when converting words to their canonic forms, the Russian words " нем", " него", " его" are replaced by the word "он", and the English words "useless", "using", "useful", "used" can thus be replaced by the word "use".

Further, in some non-limiting embodiments of the present technology, the symbolic and statistical natural language processing for texts in various different languages, such as English, Spanish, German, French, Italian, and Arabic, for example, may include using one or more package libraries (Natural Language Toolkit). According to certain non-limiting embodiments of the present technology, the symbolic and statistical natural language processing of Russian texts may include using a <pymorphy> library for morphological analysis of associated words (for example, " люди-> человек", or " гулял-> гулять").

In the context of the present specification, such normalized words are referred to herein as tokens, which may further be used, by the processor 601 to train the classifier. Thus, by normalizing as described above, each one of the plurality of text chains, the processor 601 could be configured to generate respective pluralities of training tokens.

Further, according to certain non-limiting embodiments of the present technology, the processor 601 may further be configured to aggregate a given plurality of training tokens into a respective training token vector, wherein each training token is assigned its local frequency of occurrence in the given one of the plurality of training HTML documents, such as a given training token vector having the following form <token>:<local frequency of occurrence>, which may be referred to as a respective dictionary of tokens, where each token is associated with a respective local frequency of occurrence thereof.

It should be noted that, in some non-limiting embodiments of the present technology, for each one of the plurality of text chains, the processor 601 may be configured to generate the respective training vector differently. For example, within a text of a text chain associated with the 'text' field of the given of the plurality of training HTML documents, the processor 601 may be configured to convert only words; for one associated with the 'title' and 'meta' fields, the processor 601 may further be configured to convert both words and two-gram word; and for the 'url' field, the processor 601 may further be configured to convert 1.2-gram characters in an associated one of the plurality of text chains.

Thus, by so doing, the processor 601 can be configured to generate a plurality of training token vectors based on the plurality of text chains associated with the plurality of training HTML documents. Further, in some non-limiting embodiments of the present technology, the processor 601 may further be configured to aggregate the plurality of training token vectors into an aggregated training token vector comprising a totality thereof.

The first method 200 thus proceeds to step 208.

Step 208: Determining, by the Processor, for Each One of the Respective Plurality of Training Tokens, a Respective Significance Parameter At step 208, according to certain non-limiting embodiments of the present technology, the processor 601 may be configured to determine, for each one of the aggregated training token vector associated with the plurality of training HTML documents, a respective significance parameter. Broadly speaking, the respective significance parameter is representative of how much each one of the aggregated training token vector is indicative of the harmful content of the one or more predetermined classes mentioned above.

In this regard, in some non-limiting embodiments of the present technology, the processor 601 may be configured to apply a data vectorizer script (<TfIdTransformer>) based on a term frequency-inverse document frequency (tf-idf) algorithm. More specifically, the tf-idf algorithm is configured to assess a relevance value of a given training token in the given one of the plurality of training HTML documents in relation to all of the plurality of training HTML documents. Thus, if the given training token is found more often in in the given one of the plurality of training HTML documents, while being found rarely in all other ones of the plurality of training HTML documents, the given training token is then assigned with a greater relevance value for the given one of the plurality of training HTML documents associated with one or more predetermined classes.

More specifically, according to certain non-limiting embodiments of the present technology, the processor 601 may be configured to determine the respective significance parameter in accordance with the following equation:

$$TF\text{-}IDF \text{ of a training token } A = (TF \text{ of the training token } A) * (IDF \text{ of the training token } A), \quad (1)$$

where: TF of the training token A is a local frequency of occurrence thereof, that is a frequency of occurrence of the training token a within an associated one of the plurality of training HTML documents; in other words, $$TF \text{ of the training token } A = (\text{a number of times when the training token } A \text{ has occurred in the associated one of the plurality of training HTML documents/a number of all tokens in the associated one of the plurality of training HTML documents); and} \quad (2)$$

IDF of the training token A is an inverse value of a global frequency of occurrence thereof indicative of how often the training token A occurs in all training HTML documents of the plurality of training HTML documents. As it may be appreciated, the IDF is not indicative of the relevance of the training token A; however, accounting the IDF may reduce significance parameters associated with widely used words within the plurality of training HTML documents.

In some non-limiting embodiments of the present technology, IDF may be determined according to the following equation:

$$IDF \text{ of the training token } A = \text{logarithm (a total number of training HTML documents in the plurality of training HTML documents/a number of}$$
$$\text{those ones of the plurality of training HTMl documents in which the training token } A \text{ occurs}). \quad (3)$$

Further, in some non-limiting embodiments of the present technology, the processor 601 may be configured to filter out some of the aggregated training token vector based on a predetermined significance threshold value. For example, if the local frequency of occurrence of the given token is more than 30%, whereas a global frequency of occurrence thereof is less than 10%, then the processor 601 may be configured to keep the given token in the aggregated training token vector. For example, the tokens "poker", "roulette", etc. may be typical for a "gambling" predetermined class of the harmful content; and thus, may be associated with respective significance parameters higher than the predetermined significance threshold value.

On the other hand, if the given one of the aggregated training token vector is has a respective significance parameter lower than the predetermined threshold value, the processor 601 may be configured to remove the given token form the aggregated training token vector so as not to further use the given token to train the classifier.

By so doing, in some non-limiting embodiments of the present technology, the processor 601 may be configured to identify, in the aggregated training token vector associated with the plurality of training HTML documents, training tokens that are not indicative of the harmful content of any predetermined class. For example, all training tokens indicative of interjections, prepositions, conjunctions, and particles, as well as most frequently used words in everyday speech may thus be excluded.

Thus, by doing so, the processor 601 may be configured to determine, for each one of the aggregated training token vector, the respective significance parameter.

The first method 200 thus advances to step 210.

Step 210: Aggregating, by the Processor, Respective Pluralities of Training Tokens of the Plurality of Training HTML Documents into a Training Token Matrix of the Respective Training Set of Data At step 210, according to certain non-limiting embodiments of the present technology, the processor 601 may be configured to aggregate respective aggregated training token vectors associated with the plurality of training HTML documents into a training token matrix. To that end, in some non-limiting embodiments of the present technology, the processor 601 may be configured to apply the (<TfIdTransformer>) data vectorizer script. Thus, the training token matrix associated with the plurality of training HTML documents may be structured such that: a given row of the training token matrix is representative of a respective one of the plurality of training HTML documents, such as <id of the respective one of the plurality of training HTML documents>, a given column of the training token matrix being representative of a respective training token, and a given element of the training token matrix being representative of a respective significance parameter of the respective token in the respective one of the plurality of training HTML documents.

The first method 200 hence advances to step 212.

Step 212: Training, by the Processor, the One or More Classifiers Based on the Respective Training Set of Data At step 212, in some non-limiting embodiments of the present technology, iteratively repeating the steps 202 to 210 described above, the processor 601 may be configured to generate a plurality of training token matrices, such as hundreds or even thousands thereof, thereby generating a training set of data for training the classifier to determine a likelihood parameter that the given HTML document 140 is associated with the harmful content.

However, in those non-limiting embodiments of the present technology, where the classifier comprises a set of classifiers, the processor 601 may be configured to train, based on the training set of data, each one of the set of classifiers, and further, determine the likelihood parameter based on respective outputs thereof, that is respective intermediate likelihood parameters generated thereby.

Figure 4:
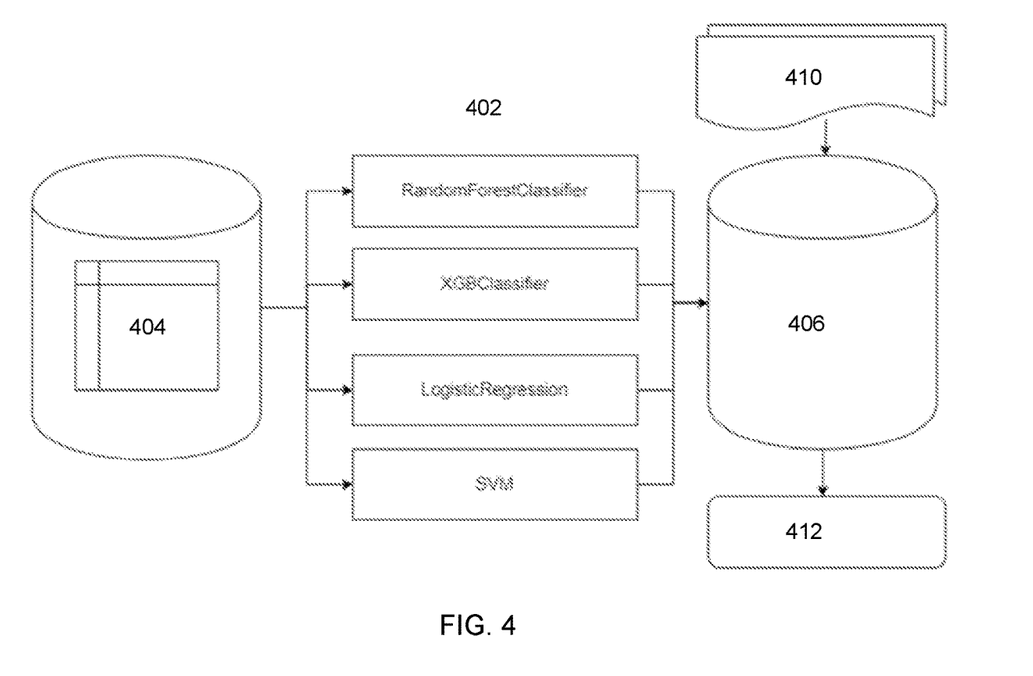
FIG. 4 depicts a schematic diagram of using one or more classifiers to detect the harmful content on the network present in FIG. 1, in accordance with certain non-limiting embodiments of the present technology.

With reference to FIG. 4, there is depicted a schematic diagram of training, by the processor 601, a set of classifiers 402, based on a training set of data 404, to detect the harmful content on the network 150, in accordance with certain non-limiting embodiments of the present technology. The training set of data 404 has been generated as described above in respect of steps 202 to 212.

According to certain non-limiting embodiments of the present technology, the set of classifiers may include at least one of a RandomForest Classifier, an XGB Classifier, a LogisticRegression Classifier, and a Support Vector Machine (SVM) Classifier. However, it should be noted that other classifiers can also be envisioned without departing from the scope of the present technology.

Further, the processor 601 may be configured to have access to a weighting system 406 configured: (1) to receive respective intermediate likelihood parameters generated by each one of the set of classifiers 402; and (2) based in part on additional data 410, generate a final decision 412 whether the given HTML document 140 is associated with the harmful content or not. For example, in some non-limiting embodiments of the present technology, the additional data 410 may be data indicative of a priority order predetermined for each of the set of classifiers 402.

For example, in specific non-limiting embodiments of the present technology, the weighting system 406 may be implemented as a VotingClassifier script of the <scikit-learn> library with the "voting=soft parameter, configured to automatically assign weights to each one of the set of classifiers 402 based on the additional data 410. More specifically, in these embodiments, the weighing system 406 renders the final decision 412, indicative of the likelihood parameter, based on a result of the probabilistic classification (<predict_proba> method) of the set of classifiers 402. That is, the weighing system 406 may be configured to average values from each one of the set of classifiers 402, wherein, before averaging, the respective intermediate likelihood parameters generated thereby are further multiplied by respective weights associated therewith.

Further, in some non-limiting embodiments of the present technology, the processor 601 may be configured to determine the priority order for each one of the set of classifiers 402 an associated F-measures. More specifically, since the predetermined classes of the harmful content are unbalanced, the associated F-measure may be considered as a most qualitative candidate for evaluating a given one of the set pf classifiers 402 in the case of an unbalanced training set of data, such as the training set of data 404. Moreover, the F-measure is obtained at the step of training the set of classifiers 402 when running the test data. Completeness and accuracy are determined for each of the predetermined classes. The resulting accuracy of each one of the set of classifiers 402 is thereafter calculated as the arithmetic mean of accuracy thereof for each one of the predetermined classes. The same applies for completeness. The average accuracy and completeness are thereafter substituted into an F-measure formula.

The first method 200 thus proceeds to step 214.

Step 214: Using, by the Processor, the One or More Classifiers to Determine a Likelihood Parameter that a Given HTML Document is Associated with the Harmful Content Thus, at step 214, the processor 601 may be configured to use the so trained one or more classifiers to detect the harmful on the network 150, such as that within the given HTML document 140.

The first method 200 thus terminates.

Detecting Harmful Content on a Network

Figure 3:
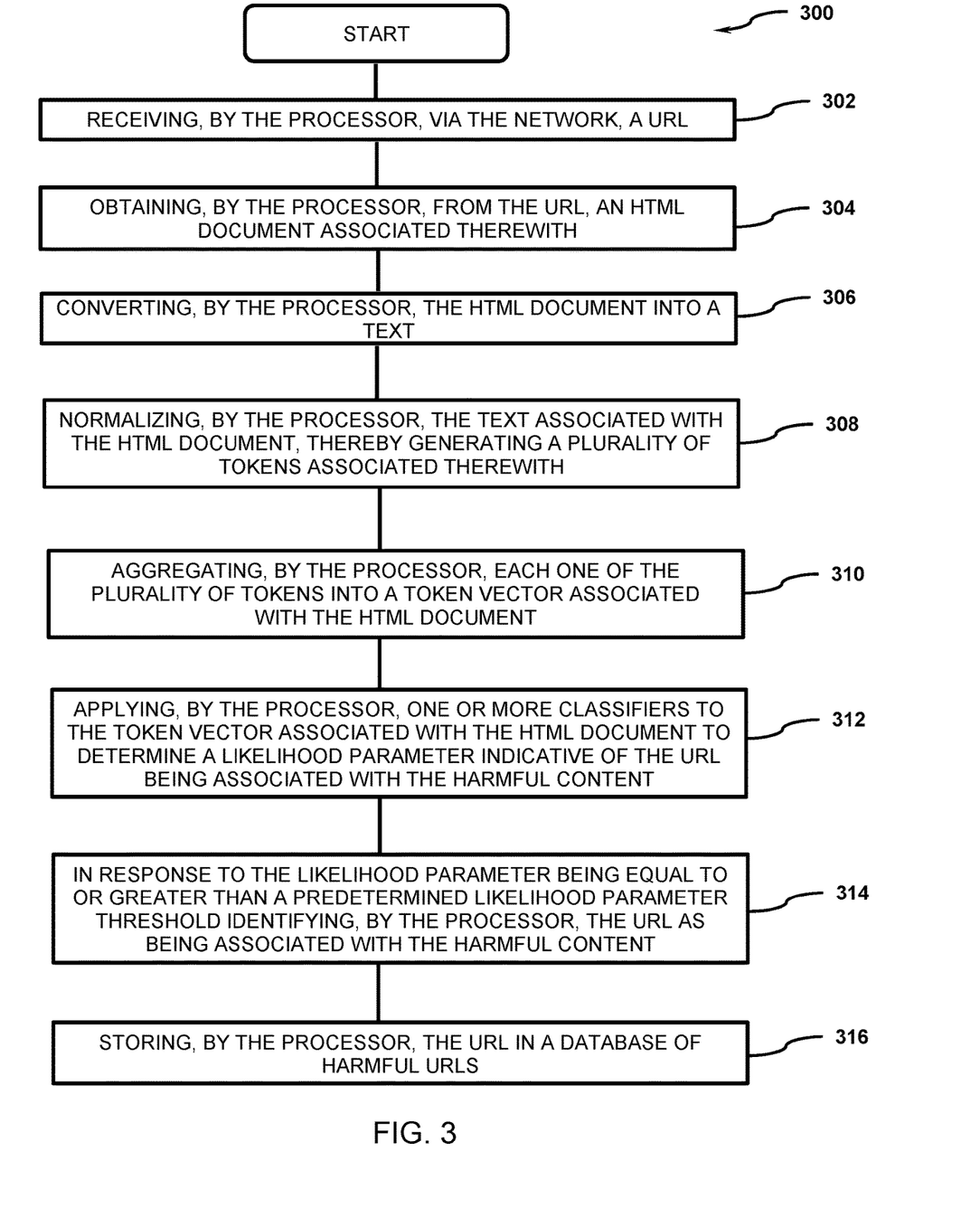
FIG. 3 depicts a flowchart diagram of a method of using the classifier trained in accordance with the method of FIG. 2 to detect the harmful content on the network present in FIG. 1, in accordance with certain non-limiting embodiments of the present technology.

With reference to FIG. 3, there is depicted a flowchart diagram of a second method 300 of using the one or more classifiers trained in accordance with the first method 200 for detecting the harmful content on the network 150 in accordance with certain non-limiting embodiments of the present technology.

Step 302: Receiving, by the Processor, Via the Network, a URL

The second method 300 commences at step 302 with the processor 601 being configured to receive, from the network 150, the given URL as described above.

The second method 300 thus advances to step 304.

Step 304: Obtaining, by the Processor, from the URL, an HTML Document Associated Therewith Further, at step 304, according to some non-limiting embodiments of the present technology, the processor 601 may be configured to obtain the given HTML document 140 located under the given URL. For example, the processor 601 may be configured to download the given HTML document 140 under the given URL.

The second method 300 thus proceeds to step 306.

Step 306: Converting, by the Processor, the HTML Document into a Text

At step 306, according to certain non-limiting embodiments of the present technology, the processor 601 may be configured to convert the given HTM document 140 into a respective text. This step may be executed similar to step 204 of the first method 200.

The second method 300 hence advances to step 308.

Step 308: Normalizing, by the Processor, the Text Associated with the HTML Document, Thereby Generating a Plurality of Tokens Associated Therewith At step 308, the processor 601 may be configured to normalize the respective text associated with the given HTML documents 140, thereby generating a plurality of tokens. According to some non-limiting embodiments of the present technology, this step may be executed similar to step 206 of the first method 200 in respect of generating the respective pluralities of training tokens.

The second method 300 hence proceeds to step 310.

Step 310: Aggregating, by the Processor, Each One of the Plurality of Tokens into a Token Vector Associated with the HTML Document Further, at step 310, based on the plurality of tokens, the processor 601 may be configured to generate a respective token vector in a fashion similar to that described above in respect of a given training token vector. As mentioned above, each one of the respective token vector may be assigned with a respective local frequency of occurrence thereof within the given HTML document 140.

The second method 300 thus proceeds to step 312.

Step 312: Applying, by the Processor, One or More Classifiers to the Token Vector Associated with the HTML Document to Determine a Likelihood Parameter Indicative of the URL being Associated with the Harmful Content At step 312, according to certain non-limiting embodiments of the present technology, the processor 601 may be configured to apply, to the respective token vector associated with the given HTML document 140, one or more classifiers trained in accordance with the first method 200 to determine the likelihood parameter indicative of the given HTML document 140 and the given URL thereof being associated with the harmful content.

The second method 300 thus proceeds to step 314.

Step 314: In Response to the Likelihood Parameter being Equal to or Greater than a Predetermined Likelihood Parameter Threshold Identifying, by the Processor, the URL as being Associated with the Harmful Content At step 314, according to certain non-limiting embodiments of the present technology, if the processor 601 determines that the likelihood parameter is equal to or greater than a predetermined likelihood threshold value, the processor 601 may further be configured to identify the given URL as being associated with the harmful content.

Figure 5:
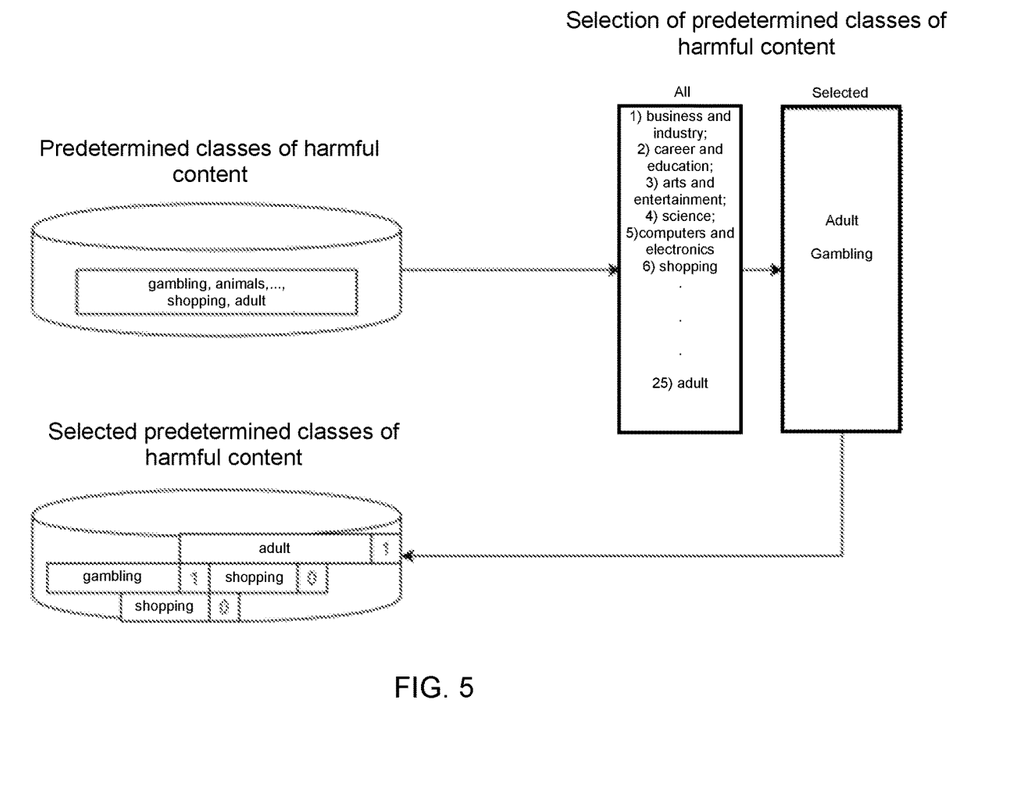
FIG. 5 depicts a schematic diagram of selecting one or more predetermined classes as harmful for executing the method of FIG. 3, in accordance with certain non-limiting embodiments of the present technology.

With reference to FIG. 5, there is depicted a schematic diagram of selecting predetermined classes of the harmful content, in accordance with certain non-limiting embodiments of the present technology. As it may appreciated, the processor 601 may be configured to identify, for example, the given URL, under which the given HTML document 140 was located, as being associated with "gambling" and "adult" predetermined classes of the harmful content, as an example.

However, it should be noted that, in various non-limiting embodiments of the present technology, predetermined classes of the harmful content can be changed as desired by users or customized by an expert working with the system 100.

Further, in accordance with certain non-limiting embodiments of the present technology, having identified the given URL as being associated with eth harmful content, the processor 601 may be configured to execute one or more predetermined actions. More specifically, the processor may be configured to execute at least one of the following predetermined actions:

restricting access to the given URL;

restricting access to the content associated with the given URL;

applying personalization methods, etc.

Furthermore, in some non-limiting embodiments of the present technology, the processor 601 may be configured to generate an analytical report on the taken actions, and further provide the analytical report to the user, for example, via causing the output module 130 to display the analytical report to the user.

Accordingly, in other non-limiting embodiments of the present technology, in response to the likelihood parameter being lower than the predetermined likelihood threshold value, the processor 601 may be configured to allow access to the given URL.

The second method 300 thus advances to step 316.

Step 316: Storing, by the Processor, the URL in a Database of Harmful URLs

Finally, at step 316, according to certain non-limiting embodiments of the present technology, the processor 601 may be configured to store the given URL in the internal database of the system 100 for further use. For example, in the example above where the given URL has been identified as being associated with the harmful content, the processor 601 may be configured to use the given HTML document 140 associated therewith for training the one or more classifiers as discussed above with regard to the first method 200.

The second method 300 thus terminates.

Computing Environment

Figure 6:
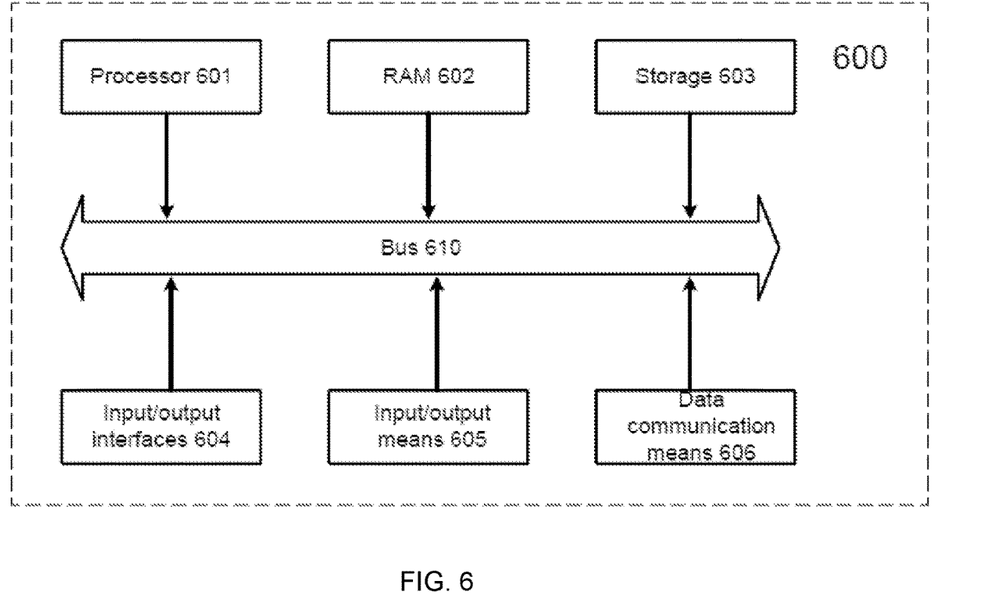
FIG. 6 depicts a schematic diagram of an example computing environment configurable for execution of one of the methods of FIGS. 2 and 3, in accordance with certain non-limiting embodiments of the present technology.

With reference to FIG. 6, there is depicted an example functional diagram of the computing environment 600 of the computing device 120 of the system 100 depicted in FIG. 1. The computing environment 600 may be configurable to implement certain non-limiting embodiments of the present technology including the first method 200 and the second method 300 described above.

In some non-limiting embodiments of the present technology, the computing environment 600 may include: the processor 601 comprising one or more central processing units (CPUs), at least one non-transitory computer-readable memory 602 (RAM), a storage 603, input/output interfaces 604, input/output means 605, data communication means 606.

According to some non-limiting embodiments of the present technology, the processor 601 may be configured to execute specific program instructions the computations as required for the computing environment 600 to function properly or to ensure the functioning of one or more of its components. The processor 601 may further be configured to execute specific machine-readable instructions stored in the at least one non-transitory computer-readable memory 602, for example, those causing the computing environment 600 to execute one of the first method 200 and the second method 300.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 602 may be implemented as RAM and contains the necessary program logic to provide the requisite functionality.

The storage 603 may be implemented as at least one of an HDD drive, an SSD drive, a RAID array, a network storage, a flash memory, an optical drive (such as CD, DVD, MD, Blu-ray), etc. The storage 603 may be configured for long-term storage of various data, e.g., the aforementioned documents with user data sets, databases with the time intervals measured for each user, user IDs, etc.

The input/output interfaces 604 may comprise various interfaces, such as at least one of USB, RS232, RJ45, LPT, COM, HDMI, PS/2, Lightning, FireWire, etc.

The input/output means 605 may include at least one of a keyboard, joystick, (touchscreen) display, projector, touchpad, mouse, trackball, stylus, speakers, microphone, and the like. A communication link between each one of the input/output means 605 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 606 may be selected based on a particular implementation of the network 120, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 404 may be configured for wired and wireless data transmission, via one of WAN, PAN, LAN, Intranet, Internet, WLAN, WMAN, or GSM networks.

These and other components of the computing environment 600 may be linked together using a common data bus 610.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for detecting harmful content on a network, the method comprising:
receiving, via the network, a URL;
obtaining, from the URL, an HTML document associated therewith;
converting, the HTML document into a text, the converting comprising extracting a respective text portion from an HTML body of the HTML document;
normalizing the text of the HTML document, the normalizing comprising transforming each word of the text to a respective canonic form thereof, thereby generating a plurality of tokens associated with the text;
aggregating each one of the plurality of tokens into a token vector associated with the HTML document;
applying one or more classifiers to the token vector associated with the HTML document to determine a likelihood parameter indicative of the HTML document containing the harmful content,
the one or more classifiers having been trained to determine the harmful content based on a respective training set of data, the respective training set of data comprising a training token matrix having been generated by:
receiving a plurality of training HTML documents;
converting each one of the plurality of training HTML documents, into a respective training text of a plurality of training texts, the converting comprising extracting the respective text portion from an HTML body of each one of the plurality of training HTML document;
normalizing a given one of the plurality of training texts, the normalizing comprising transforming each word of the given one of the plurality of training texts to a respective canonic form thereof, thereby generating a respective plurality of training tokens associated with the given one of the plurality of training texts,
determining, for each one of the respective plurality of training tokens, a respective significance parameter,
the respective significance parameter associated with a given one of the respective plurality of training tokens being determined based on a product of multiplication of a local frequency of occurrence and an inverse value of a global frequency of occurrence associated therewith,
the local frequency of occurrence being a frequency of occurrence of the given one of the respective plurality of training tokens within the given one of the plurality training texts associated with a respective one of the plurality of training HTML documents; and
the global frequency of occurrence being a frequency of occurrence of the given one of the respective plurality of training tokens within the plurality of training texts of the plurality of training HTML documents;
aggregating respective pluralities of training tokens of the plurality of training HTML documents associated with respective significance parameters into the training token matrix;
in response to the likelihood parameter being equal to or greater than a predetermined likelihood parameter threshold:
determining that the HTML document located under the URL contains the harmful content; and
storing the URL in a database of harmful URLs.

2. The method of claim 1, further comprising restricting access to the URL.

3. The method of claim 1, wherein the normalizing comprises applying one or more natural language processing techniques.

4. The method of claim 3, wherein the normalizing one of the text and the given one of the plurality of training texts further comprises at least one of:
excluding punctuation from each one of the text and the given one of the plurality of training texts;
transforming all letters to lower case; and
morphological analysis.

5. The method of claim 1, wherein the training token matrix is structured such that:
a given row of the training token matrix is representative of a respective one of the plurality of training HTML documents;
a given column of the training token matrix is representative of a respective training token; and
a given element of the training token matrix is representative of a respective significance parameter of the respective token in the respective one of the plurality of training HTML documents.

6. The method of claim 1, wherein:
converting one of the HTML document and a given one of the plurality of training HTML documents into a respective text further comprises extracting respective text portions of the respective text from one or more predetermined fields of the one of the HTML document and a given one of the plurality of training HTML documents; and
normalizing the respective text includes normalizing each one of the respective text portions in parallel.

7. The method of claim 6, wherein the one or more predetermined fields of the one of the HTML document and a given one of the plurality of training HTML documents include at least one of: 'text', 'title', 'meta', and 'url'.

8. The method of claim 1, wherein the generating the plurality of tokens associated with the HTML document further comprises:
identifying, within the plurality of tokens, a sub-plurality of tokens, wherein each one of the sub-plurality of tokens is associated with at least one of a plurality of predetermined classes of the harmful content; and
aggregating the sub-plurality of tokens into the token vector associated with the HTML document.

9. The method of claim 8, wherein the plurality of predetermined classes of the harmful content includes at last one of: business and industry, career and education, arts and entertainment, science, computers and electronics, shopping, reference, people and society, internet and telecom, sports, finance, adult, autos and vehicles, books and literature, health, games, law and government, travel, news and media, home and garden, food and drink, gambling, recreation and hobbies, beauty and fitness, and pets and animals.

10. A method for detecting harmful content on a network using one or more classifiers, the method comprising training the one or more classifiers based on a respective training set of data by executing the steps of:
receiving a plurality of training HTML documents;
converting each one of the plurality of training HTML documents, to a respective training text of a plurality of training texts, the converting comprising extracting a respective text portion from an HTML body of each one of the plurality of training HTML document;
normalizing a given one of the plurality of training texts, the normalizing comprising transforming each word of the given one of the plurality of training texts to a respective canonic form thereof, thereby generating a respective plurality of training tokens associated with the given one of the plurality of training texts;
determining, for each one of the respective plurality of training tokens, a respective significance parameter, the respective significance parameter associated with a given one of the respective plurality of training tokens being determined based on a product of multiplication of a local frequency of occurrence and an inverse value of a global frequency of occurrence associated therewith,
the local frequency of occurrence being a frequency of occurrence of the given one of the respective plurality of training tokens within the given one of the plurality training texts associated with a respective one of the plurality of training HTML documents; and
the global frequency of occurrence being a frequency of occurrence of the given one of the respective plurality of training tokens within the plurality of training texts of the plurality of training HTML documents;
aggregating respective pluralities of training tokens of the plurality of training HTML documents into a training token matrix of the respective training set of data, wherein:
a given row of the training token matrix is representative of a respective one of the plurality of training HTML documents;
a given column of the training token matrix is representative of a respective training token; and
a given element of the training token matrix is representative of a respective significance parameter of the respective token in the respective one of the plurality of training HTML documents;
training the one or more classifiers based on the respective training set of data;
using the one or more classifiers to determine a likelihood parameter that a given HTML document contains the harmful content.

11. The method of claim 10, wherein the normalizing further comprises applying one or more natural language processing techniques.

12. The method of claim 10, wherein the determining the likelihood parameter is based on respective decisions generated by the one or more classifiers, and each one of the respective decisions being assigned a respective decision weight.

13. The method of claim 10, wherein the one or more classifiers includes at least one of: a Random Forest classifier, an XGB classifier, a Logistic Regression classifier, and an SVM classifier.

14. The method of claim 10, further comprising identifying, in the respective plurality of training tokens, tokens non-indicative of the harmful content and deleting the tokens non-indicative of the harmful content therefrom.

15. The method of claim 10, wherein the generating the respective plurality of training tokens further comprises:
identifying, within the respective plurality of training tokens, a sub-plurality of training tokens associated with at least one of a plurality of predetermined classes of harmful content; and
aggregating the sub-plurality of training tokens into the training token matrix.

16. The method of claim 15, wherein the plurality of predetermined classes of the harmful content includes at last one of: business and industry, career and education, arts and entertainment, science, computers and electronics, shopping, reference, people and society, internet and telecom, sports, finance, adult, autos and vehicles, books and literature, health, games, law and government, travel, news and media, home and garden, food and drink, gambling, recreation and hobbies, beauty and fitness, pets and animals.

17. A system for detecting harmful content on a network, the system comprising a computing device, the computing device further comprising:
at least one processor;
at least one non-transitory computer-readable medium comprising instructions, which, when executed by the at least one processor, cause the system to:
receive, via the network, a URL;
obtain, from the URL, an HTML document associated therewith;
convert the HTML document into a text by extracting a respective text portion from an HTML body of the HTML document;
normalize the text associated with the HTML document by transforming each word of the text to a respective canonic form thereof, thereby generating a plurality of tokens associated with the text;
aggregate each one of the plurality of tokens into a token vector associated with the HTML document;
apply one or more classifiers to the token vector associated with the HTML document to determine a likelihood parameter indicative of the HTML document containing the harmful content,
the one or more classifiers having been trained to determine the harmful content based on a respective training set of data, the respective training set of data having been generated by:
receiving a plurality of training HTML documents;
converting each one of the plurality of training HTML documents, into a respective training text of a plurality of training texts, the converting comprising extracting the respective text portion from an HTML body of each one of the plurality of training HTML document;
normalizing a given one of the plurality of training texts, the normalizing comprising transforming each word of the given one of the plurality of training texts to a respective canonic form thereof, thereby generating a respective plurality of training tokens associated with the given one of the plurality of training texts, determining for each one of the respective plurality of training tokens, a respective significance parameter, a given significance parameter associated with a given one of the plurality of training tokens being determined based on a product of multiplication of: a local frequency of occurrence of the given one of the plurality of training tokens within the given one of the plurality training texts associated with a respective one of the plurality of training HTML documents; and a global frequency of occurrence of the given one of the respective plurality of training tokens within the plurality of training texts of the plurality of training HTML documents;

aggregating respective pluralities of training tokens of the plurality of training HTML documents associated with respective significance parameters into a training token matrix of the respective training set of data, wherein: a given row of the training token matrix being representative of a respective one of the plurality of training HTML documents; a given column of the training token matrix being representative of a respective training token; and a given element of the training token matrix being representative of a respective significance parameter of the respective token in the respective one of the plurality of training HTML documents; and in response to the likelihood parameter being equal to or greater than a predetermined likelihood parameter threshold:

determining, by the processor, that the HTML document located under the URL contains the harmful content; and store the URL in a database of harmful URLs.

* * * * *